United States Patent [19]
Stewart

[11] 3,798,807
[45] Mar. 26, 1974

[54] LIGHT TABLE FILM OR SHEET SPOOL PERIPHERAL DRIVE

[76] Inventor: Wilton A. Stewart, 16624 Linda Ter., Pacific Palisades, Calif. 90272

[22] Filed: July 13, 1972

[21] Appl. No.: 271,291

[52] U.S. Cl. .................................. 40/31, 242/67.4
[51] Int. Cl. .......................................... G09f 11/28
[58] Field of Search ................... 40/31, 86, 87–95, 40/347, 117; 242/66, 67.3, 67.4; 281/11

[56] References Cited
UNITED STATES PATENTS

| | | | |
|---|---|---|---|
| 2,188,210 | 1/1940 | Smith | 40/31 |
| 3,055,606 | 9/1962 | Alden | 242/67.3 X |
| 657,175 | 9/1900 | Miller | 40/31 |
| 3,375,991 | 4/1968 | Conforti et al. | 242/66 |
| 3,203,636 | 8/1965 | Owen | 242/55.12 |

Primary Examiner—Robert W. Michell
Assistant Examiner—L. R. Oremland
Attorney, Agent, or Firm—White, Haefliger & Bachand

[57] ABSTRACT

A light table assembly for transporting film between supply and take-up reels, and for illuminating the transported film, comprises:
 a. a light table, and
 b. mechanism for effecting film transport proximate the table for illumination, such mechanism including certain roller means located to receive weight imposed by at least one of the reels, via the periphery thereof, and to develop film advancing force transmitted to the film in response to rotation of said certain roller means.

4 Claims, 3 Drawing Figures

PATENTED MAR 26 1974 3,798,807
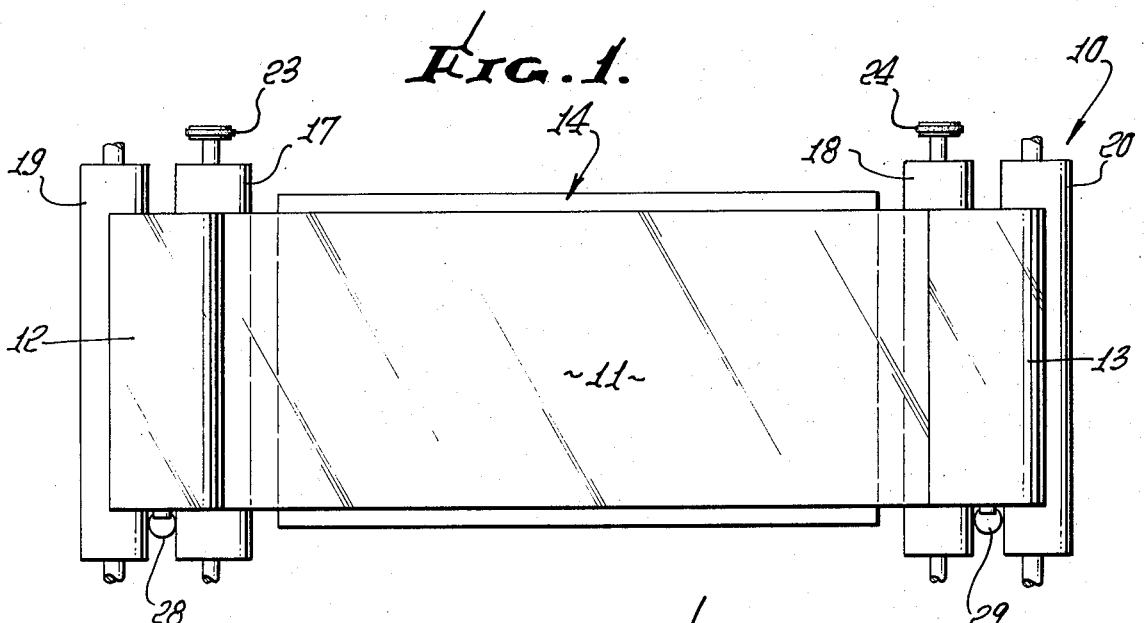
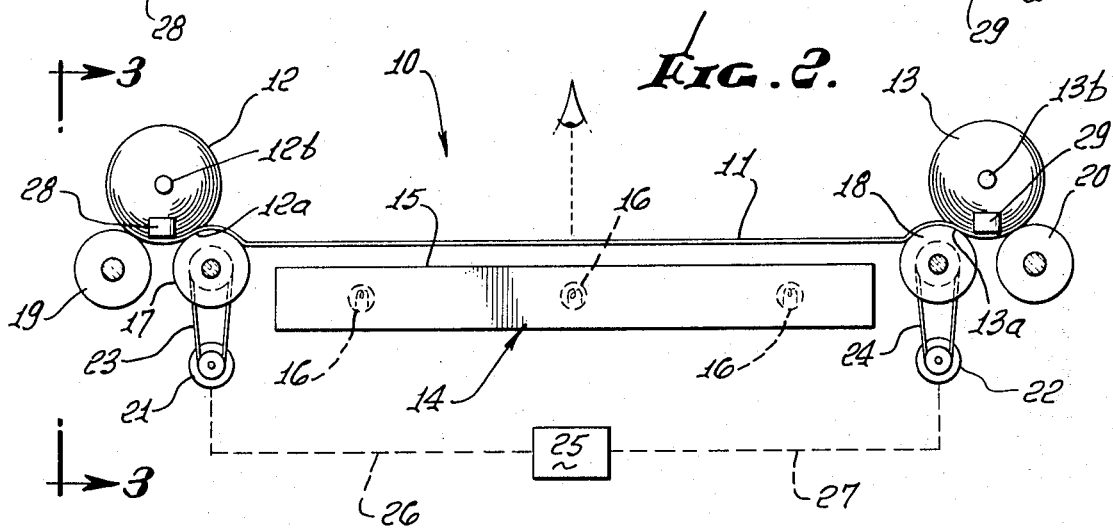
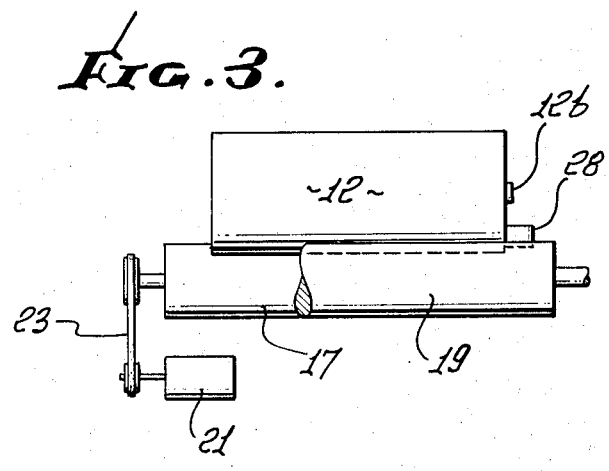

3,798,807

LIGHT TABLE FILM OR SHEET SPOOL PERIPHERAL DRIVE

BACKGROUND OF THE INVENTION

This invention relates generally to light table or box assemblies, more particularly concerns a film viewer wherein film reels or rolls may be very simply and rapidly mounted on and removed from the assembly.

Assemblies for film viewing have in the past incorporated drives for film reels to transport the film past the light source or table for selective viewing purposes. Such assemblies have required coaxial mounting of the film reels on spindles, which is time consuming and requires undesirable design complexity in the apparatus. There is therefore a need for improvement in the design of such devices.

SUMMARY OF THE INVENTION

It is a major object of the invention to provide highly versatile and simple apparatus for mounting and driving film reels, in relation to light tables, obviating problems and objections encountered in prior devices.

Basically, the invention contemplates the provision of film transport mechanism including certain roller means located to receive weight imposed by at least one of the cells, via the periphery thereof, and to develop film advancing force transmitted to the film in response to roller rotation. As will appear, the certain roller means typically may include first and second drive rollers for engaging the undersides of the supply and take-ups reels, respectively; and third and fourth rollers may also engage the undersides of the reels for idling during film transport, one reel cradled between the first and third rollers, and the other reel cradled between the second and fourth rollers.

Other objects include the provision of guide rollers to engage the sides of the reels; and motor means operatively connected to the drive rollers to supply torque to the reels acting to maintain the film in tension between the reels, and to effect advancement of the film between the reels. Slippage of the peripherally engaged reels and drive rollers is prevented by providing resiliently deflectible surfaces at the latter, as will be described.

These and other objects and advantages of the invention, as well as the details of an illustrative embodiment, will be more fully understood from the following description and drawings, in which:

DRAWING DESCRIPTION

FIG. 1 is a top plan view of apparatus incorporating the invention;

FIG. 2 is a side elevation of the FIG. 1 apparatus;

FIG. 3 is an end elevation of the FIG. 1 apparatus.

DETAILED DESCRIPTION

The illustrated light table assembly 10 is characterized as operable to transport film at 11 between supply and take-up reels 12 and 13, and to illuminate the transported film 11 as by means of a light box or table 14. Merely as illustrative, the box may have a translucent panel 15 through which light travels from source lamps 16 to illuminate the film, for viewing from above. Either of the reels may be considered as the take-up reel, the other than being the supply reel, inasmuch as the film may be transported in either direction across the light box.

In accordance with the invention, the mechanism for effecting film transport proximate the table includes certain roller means located to receive weight imposed by at least one of the reels 12 and 13, via the reel periphery, and to develop film advancing force transmitted to the film in response to rotation of that roller means. For example, the latter may include first and second drive rollers 17 and 18 for engaging the undersides 12a and 13a of the reels, respectively. In addition, the mechanism may include third and fourth rollers 19 and 20 also engaging the undersides of the reels 12 and 13, respectively, to freely idle during film transport between the reels. The roller locations are preferably such that, as shown, reel 12 is cradled by rollers 17 and 19, while reel 13 is cradled by rollers 18 and 20.

The transport mechanism may also include motor means operatively connected to the drive rollers to supply torque for maintaining in tension the film extend being transported between the reels. For example, motors 21 and 22 may be belt connected at 23 and 24 to the rollers 17 and 18 respectively so as to apply small, oppositely directed holding torques to these rollers. The film may be transported slowly in either direction by increasing the torque applied to one or the other of the rollers; for this purpose, control means is shown at 25 as operatively connected at 26 and 27 to the motors, to control direction and speed of film advance. See for example the control described in that certain Stewart et al. U.S. Pat. application Ser. No. 854,980.

The surfaces of the drive rollers 17 and 18 are preferably characterized as resiliently slightly deformed under the reel-imposed weight, to form substantial contact area to prevent slippage against the film, the latter for example being photographic negative type (acetate), although other films are usable. For this purpose, the rollers may have soft rubber peripheral layers.

Guide rollers are shown at 28 and 29 engaging the sides of the reeled film windings, for proper alignment.

In use, a roll or reel 12 of film is simply laid on, i.e., cradled between, rollers 17 and 19 at one end of box 14, it not being necessary to engage spindles or make any other adjustments for different film widths. The film is then extended across the table at 11, and wrapped around the take-up reel core, indicated at 13b (Reel 12 has a similar core 12b). The reel 13 is then placed on, i.e., cradled between, rollers 18 and 20 at the opposite end of the box, with the guide rollers 28 and 29 engaging the reels. Roller 18 may then be operated as the dominant drive roller to wind the film on take-up reel 13. When finished viewing, the reels are simply lifted off the roller pairs 17 and 19, and 18 and 20.

I claim:

1. In a light table assembly for transporting film between supply and take-up reels, and for illuminating the transported film, the combination comprising
   a. a light table,
   b. mechanism for effecting film transport proximate the table for illumination, said mechanism including first and second drive rollers located to engage the film at the undersides of said supply and take-up reels, respectively, and to develop film advancing force transmitted to the film in response to rotation of a selected one of said drive rollers, and c. third and fourth idler rollers located for engaging the film at the undersides of said supply and take-up reels, respectively, and idling during said film transport between the reels, the first and third rollers spaced to cradle the film on one reel and the second and fourth rollers spaced to cradle the film on the other reel, the idlers having elongated smooth surfaces, and d. motor means connected to selectively drive the first and second rollers to supply torque thereto for maintaining in tension the film being advanced between the first and second reels and for effecting drive roller rotation to so advance the film.

2. The combination of claim 1 including said supply and take-up reels, the film at the undersides of which is engaged by the respective pairs of drive and idler rollers as defined.

3. The combination of claim 1 including guide roller means engaging the sides of said film forming said reels.

4. In a light table assembly for transporting film between supply and take-up reels, and for illuminating the transported film, the combination comprising a. a light table, b. mechanism for effecting film transport proximate the table for illumination, said mechanism including first and second drive rollers located to engage the film at the undersides of said supply and take-up reels respectively, and to develop film advancing force transmitted to the film in response to rotation of a selected one of the drive rollers, and c. third and fourth rollers also engaging the film at the undersides of said supply and take-up reels, respectively, and idling during said film transport between the reels, the film on one reel cradled by the first and third rollers, and the film on the other reel cradled by the second and fourth rollers, and d. said drive rollers having resiliently deformable, relatively soft elastomer outer portions to engage the reeled film so as to be resiliently deformed by weight of said reeled film imposed thereon.

* * * * *